United States Patent
Decker et al.

(10) Patent No.: US 9,921,890 B2
(45) Date of Patent: Mar. 20, 2018

(54) EVENT GENERATION MANAGEMENT FOR AN INDUSTRIAL CONTROLLER

(71) Applicant: Rockwell Automation Technologies, Inc., Mayfield Heights, OH (US)

(72) Inventors: Eric D. Decker, Macedonia, OH (US); Kenwood H. Hall, Hudson, OH (US); Robert J. Kretschmann, Bay Village, OH (US); Terence S. Tenorio, Solon, OH (US); Scott A. Pierce, Concord Township, OH (US); Bret S. Hildebran, Chagrin Falls, OH (US); Raymond R. Husted, Middlefield, OH (US); Gregg Sichner, Mentor, OH (US); David M. Fort, Lyndhurst, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 279 days.

(21) Appl. No.: 14/554,595

(22) Filed: Nov. 26, 2014

(65) Prior Publication Data

US 2016/0147579 A1 May 26, 2016

(51) Int. Cl.
*G06F 9/46* (2006.01)
*G06F 9/54* (2006.01)
*G06F 9/48* (2006.01)

(52) U.S. Cl.
CPC ............ *G06F 9/542* (2013.01); *G06F 9/4881* (2013.01)

(58) Field of Classification Search
CPC ................ G06F 9/542; G06F 9/4881
See application file for complete search history.

(56) References Cited

U.S. PATENT DOCUMENTS

| | | |
|---|---|---|
| 5,491,792 A | 2/1996 | Grisham et al. |
| 6,408,324 B1 | 6/2002 | Wallace et al. |
| 7,624,396 B1 | 11/2009 | Isenberg |
| 8,238,502 B2 * | 8/2012 | Magagni ............ H04L 7/10 375/368 |
| 8,489,554 B2 | 7/2013 | Xu et al. |
| 2008/0109564 A1 | 5/2008 | Arndt |
| 2012/0265322 A1 | 10/2012 | Hildebran et al. |

FOREIGN PATENT DOCUMENTS

| | | |
|---|---|---|
| EP | 0802477 A1 | 10/1997 |
| EP | 2511778 A2 | 10/2012 |

OTHER PUBLICATIONS

Extended European Search Report dated Apr. 28, 2016; European Patent Application No. 15195748.7—(9) pages.

* cited by examiner

*Primary Examiner* — James J Lee
(74) *Attorney, Agent, or Firm* — Boyle Fredrickson, SC

(57) ABSTRACT

An improved system for handling events in an industrial control system is disclosed. A module in an industrial controller is configured to generate an event responsive to a predefined signal or combination of signals occurring. The event is transferred to an event queue for subsequent execution. The event queue may also be configured to store a copy of the state of the module at the time the event is generated. The event queue may hold multiple events and each event is configured to trigger at least one event task. Subsequent events that occur during execution of the event task are stored in the event queue for later execution. An event, or combination of events, may trigger execution of an event task within the module, within the controller to which the module is connected, or within multiple controllers.

12 Claims, 11 Drawing Sheets

EVENT GENERATION MANAGEMENT FOR AN INDUSTRIAL CONTROLLER

BACKGROUND OF THE INVENTION

The subject matter disclosed herein relates generally to industrial control networks for controlling machines and industrial processes and, more specifically, to handling events generated within the industrial controller.

Industrial controllers are special purpose computers used for controlling factory automation and the like. Industrial controllers typically execute a control program highly customized to a particular control application. Special control languages, such as "relay ladder logic" are normally used to facilitate programming of the device. Under the direction of the stored program, a processor of the industrial controller periodically examines the state of input devices and updates the state of output devices. In order to ensure predictable control of a machine or process, the control program must be highly reliable and deterministic, that is, executing at well-defined time periods.

As industrial processes grow in complexity, an increasing number of devices are being connected to the industrial controller. The devices are often distributed about a machine or along a process line. The increasing number of devices and distribution of these devices about the machine require more complex control programs. In addition, the controlled processes are continually demanding higher throughput or rates of production. As a result, the inputs to the controller are generated at higher rates and require that the signals output from the controller be generated at higher rates.

It is understood that increasing the speed at which a processor executes allows a control program to be executed at a faster rate. However, increasing processor speed is not without drawbacks. Increasing the clock speed creates timing issues between other hardware components in the processor module. Further, an increased clock speed can generate undesirable radiated emissions from interconnections that begin to function as an antenna. In addition, the increasing complexity of the system often results in additional length of the control program. Because control programs are executed at a periodic interval, the additional length of the control program may result in the control program executing within the same time interval, or perhaps in a longer time interval, even with increased processor speed. Thus, it would be desirable to provide an improved system for handling the increased rate at which input signals are received and output signals must be generated.

It is also understood that not all of the inputs need to be processed with an increased frequency. One method for increasing the rate of processing input signals is to identify a portion of the inputs that require increased processing and generate an interrupt when the input signal is, for example, at a certain state or changes state. An interrupt handler may then execute a small portion of control code which updates one or more output signals responsive to the input signal. Upon completion of the small portion of control code, the interrupt handler returns to execution of the general control program. An interrupt handler, however, is not without drawbacks as well. As an increasing number of inputs are identified as requiring processing at an increased frequency, the amount of time required to process the interrupt control code increases and may increase to a point where the general control code cannot complete within the required time interval to provide the deterministic control required by an industrial controller. Further, as the number of interrupts increases, the likelihood that additional interrupts occur while another section of interrupt control code is executing increases. Thus, execution of the subsequent interrupt control code may not be executed.

Even if all of the interrupt control code is executed, the interrupt control code may execute based on inaccurate data. The interrupt handler must first receive the input signal to indicate that the interrupt control code is to be executed. The input signal may occur at a location remote from the controller and may be passed, for example, from a remote input module through an input scanner and an industrial network to the controller. By the time the controller receives the input indicating that the interrupt control code needs to be executed, the state of one or more of the inputs in the process may have changed. Thus, when the interrupt control code executes it may generate output signals based on an inaccurate set of input signals. Thus, it would be desirable to provide an improved system for handling events in an industrial control system for a controlled machine or process.

BRIEF DESCRIPTION OF THE INVENTION

The subject matter disclosed herein describes an improved system for handling events in an industrial control system for a controlled machine or process. A module in an industrial controller is configured to generate an event responsive to a predefined signal or combination of signals occurring. The event is transferred to an event queue for subsequent processing. The event queue may also be configured to store a copy of the state of the module, for example, whether each of the terminals in a digital input module were on or off, at the time the event is generated. The event queue may hold multiple events and may be processed in a first-in-first-out manner or based on a priority assigned to each event. Each event is configured to trigger one or more event tasks. When an event is retrieved from the event queue, the event task, or tasks, is executed. The event tasks similarly may be assigned a priority and, if multiple events occur in tandem or while another event task is executing, the event tasks may be executed based on their assigned priority. According to one aspect of the invention, a single event may trigger execution of an event task within the module or within the controller to which the module is connected. Optionally, a single event may trigger execution of an event task in multiple controllers. According to still another aspect of the invention, a sequence or combination of multiple events occurring may trigger the execution of a single event task.

According to one embodiment of the invention, an Input/Output (I/O) module for an industrial controller operable to control a machine or process is disclosed. The I/O module includes multiple terminals, an event generator, an event queue, and a processor. Each terminal is configured to transmit either an input signal or an output signal between the I/O module and a controlled device for the machine or process, and the input signal and the output signal each have at least one state. The event generator is operable to generate an event responsive to the state of at least one input or output signal. The event queue is configured to receive each event generated and to store a plurality of events. The processor receives each event from the event queue and initiates execution of an event task corresponding to the event. The event queue may also be configured to receive the state of each of the plurality of terminals at the time each event is generated and to store the state of each of the plurality of terminals along with the corresponding event.

According to another embodiment of the invention, an event handling system for an industrial control system is disclosed. The event handling system includes an I/O module and a processor module. The module includes a plurality of terminals and an event generator. Each terminal transmits a signal between the terminal and a device in the industrial control system, and the event generator is operable to generate an event responsive to the signal of at least one of the plurality of terminals. The processor module is operable to execute at least one event task responsive to each event. A memory device is included in either the I/O module or the processor module, where the memory device is configured to store an event queue. An indication of each event is loaded in the event queue when the event is generated, and the processor module receives the indication of each event from the event queue to initiate execution of the event task corresponding to the event.

According to still another embodiment of the invention, a method of handling multiple events in an industrial control system is disclosed. A first event is generated in an I/O module, where the I/O module includes a plurality of terminals configured to transmit a signal between the I/O module and a device in the industrial control system and the signal at each of the plurality of terminals has at least one state. The first event is transmitted to a processor module, and the processor module initiates execution of a first event task responsive to the first event. At least one additional event is generated in the I/O module prior to completion of the first event task. Each additional event corresponds to either a present state of the signal or a change in state of the signal for at least one of the plurality of terminals. Each additional event is stored in an event queue on a memory device in the I/O module. Each additional event is transmitted to the processor module, and the processor module initiates execution of an additional event task responsive to each additional event.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
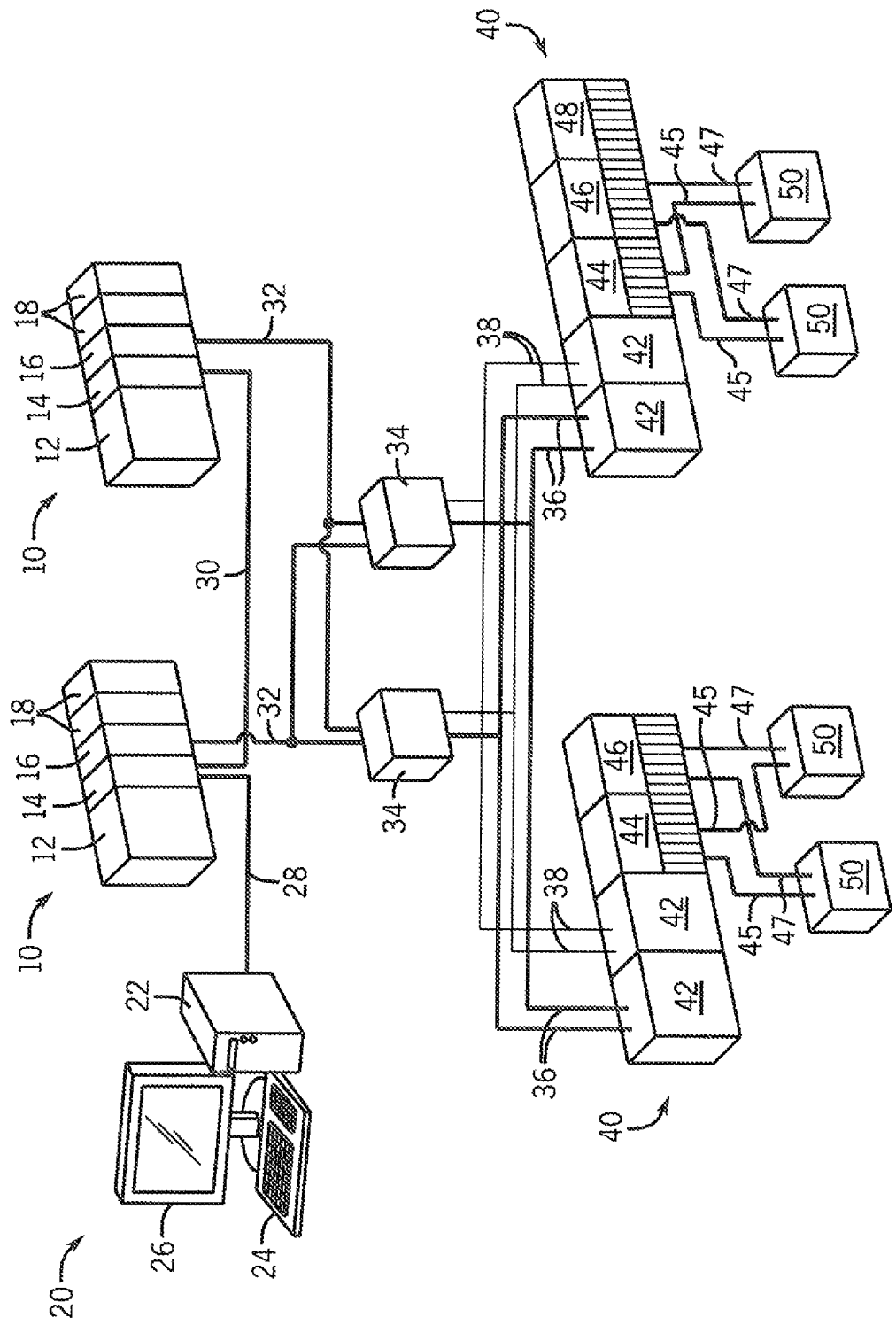
FIG. 1 is a schematic representation of an exemplary industrial control network incorporating an event handling system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Turning initially to FIG. 1, an exemplary industrial control network includes a pair of industrial controllers 10. As illustrated, the industrial controller 10 is modular and may be made up of numerous different modules connected together in a rack or mounted to a rail. Additional modules may be added or existing modules removed and the industrial controller 10 reconfigured to accommodate the new configuration. Optionally, the industrial controller 10 may have a predetermined and fixed configuration. Each of the illustrated industrial controllers 10 includes a power supply module 12, processor module 14, and network module 16.

Each industrial controller 10 is further shown with two additional modules 18 that may be selected according to the application requirements and may be, for example, analog or digital input or output modules, which will be referred to herein generally as an I/O module.

One or more operator interfaces 20 may be connected to the industrial control network. Each operator interface 20 may include a processing device 22, input device 24, including, but not limited to a keyboard, touchpad, mouse, trackball, or touch screen, and a display device 26. It is contemplated that each component of the operator interface may be incorporated into a single unit, such as an industrial computer, laptop, or tablet computer. It is further contemplated that multiple display devices 26 and/or multiple input devices 24 may be distributed about the controlled machine or process and connected to one or more processing devices 22. The operator interface 20 may be used to display operating parameters and/or conditions of the controlled machine or process, receive commands from the operator, or change and/or load a control program or configuration parameters. An interface cable 28 connects the operator interface 20 to one of the industrial controllers 10.

The industrial controllers 10 are connected to other devices by one or more networks according to the application requirements. As illustrated, an interface cable 30 directly connects each of the processor modules 14. A redundant network topology is established by connecting the network interface module 16 of both industrial controllers 10 to each of a pair of switches 34 by a network cable 32. Each switch 34 is connected to one of a pair of remote racks 40 by a suitable network cable 36, 38. It is contemplated that the interface cable 30 or any of the network cables 32, 36, 38 may be a custom cable configured to communicate via a proprietary interface or may be any standard industrial network, including, but not limited to, Ethernet/IP, DeviceNet, or ControlNet. Each network module 16 and switch 34 is configured to communicate according to the protocol of the network to which it is connected and may be further configured to translate messages between two different network protocols.

Each remote rack 40 may be positioned at varying positions about the controlled machine or process. As illustrated, each remote rack 40 is modular and may be made up of numerous different modules connected together in a rack or mounted to a rail. Additional modules may be added or existing modules removed and the remote rack 40 reconfigured to accommodate the new configuration. Optionally, the remote rack 40 may have a predetermined and fixed configuration. As illustrated, each remote rack 40 includes a pair of network modules 42, each network module 42 connected to one of the redundant networks, an input module 44, and an output module 46. Each of the input modules 44 is configured to receive input signals 45 from controlled devices 50, and each of the output modules 46 is configured to provide output signals 47 to the controlled devices 50. Optionally, still other modules 48 may be included in the remote rack 40. It is understood that the industrial control network, industrial controller 10, and remote racks 40 may take numerous other forms and configurations without deviating from the scope of the invention.

Figure 2:
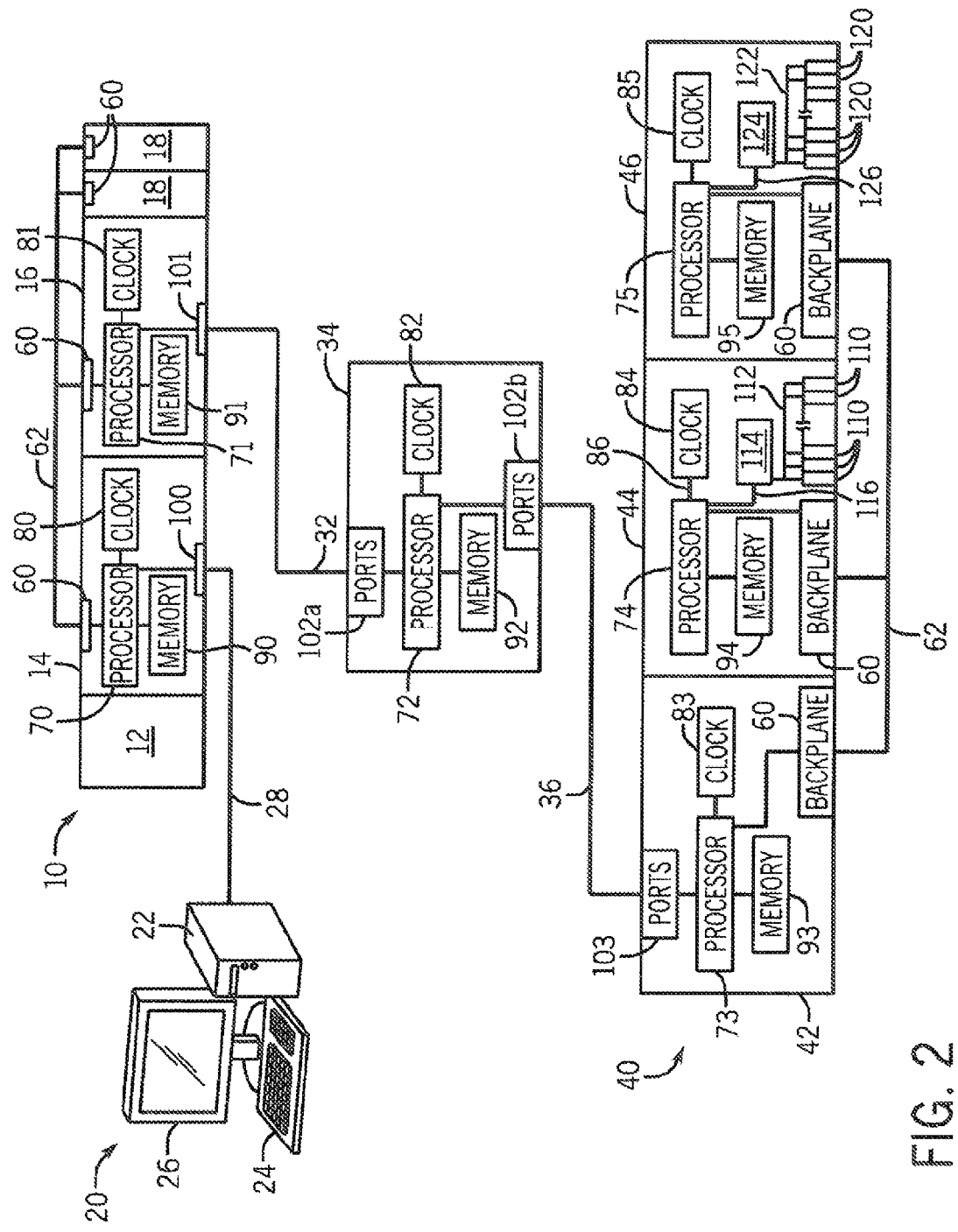
FIG. 2 is a block diagram representation of a portion of the exemplary industrial control network of FIG. 1.

Referring next to FIG. 2, a portion of the exemplary industrial control network of FIG. 1 is illustrated in block diagram form. Due to factors such as the increasingly distributed nature of the control network and the increasing capability and reduced cost of processing devices, it is contemplated that each of the nodes in the network may include a processor 70-75 and a memory device 90-95. The processors 70-75 are configured to execute instructions and to access or store operating data and/or configuration parameters stored in the corresponding memory device 90-95. The processors 70-75 may be any suitable processor according to the node requirements. It is contemplated that processors 70-75 may include a single processing device or multiple processing devices executing in parallel and may be implemented in separate electronic devices or incorporated on a single electronic device, such as a field programmable gate array (FPGA) or application specific integrated circuit (ASIC). Similarly, the memory devices 90-95 may be a single device, multiple devices or may be incorporated in part or in whole within the FPGA or ASIC. Each of the nodes also includes a clock circuit 80-85, and each clock circuit 80-85 is preferably synchronized with the other clock circuits 80-85 according to, for example, the IEEE-1588 clock synchronization standard. Each clock circuit 80-85 generates a time signal configurable to report the present time accurate to either microseconds or nanoseconds. Communication between nodes mounted in the same rack or contained within a single housing occurs via a backplane 62 and a corresponding backplane connector 60. Nodes communicating via network media 28, 32, 36 include ports 100-103 configured to process the corresponding network protocol. Each input module 44 includes input terminals 110 configured to receive the input signals 45 from the controlled devices 50. The input module 44 also includes any associated logic circuitry 114 and internal connections 112, 116 required to process and transfer the input signals 45 from the input terminals 110 to the processor 74. Similarly, each output module 46 includes output terminals 120 configured to transmit the output signals 47 to the controlled devices 50. The output module 46 also includes any associated logic circuitry 124 and internal connections 122, 126 required to process and transfer the output signals 47 from the processor 75 to the output terminals 120.

Figure 3:
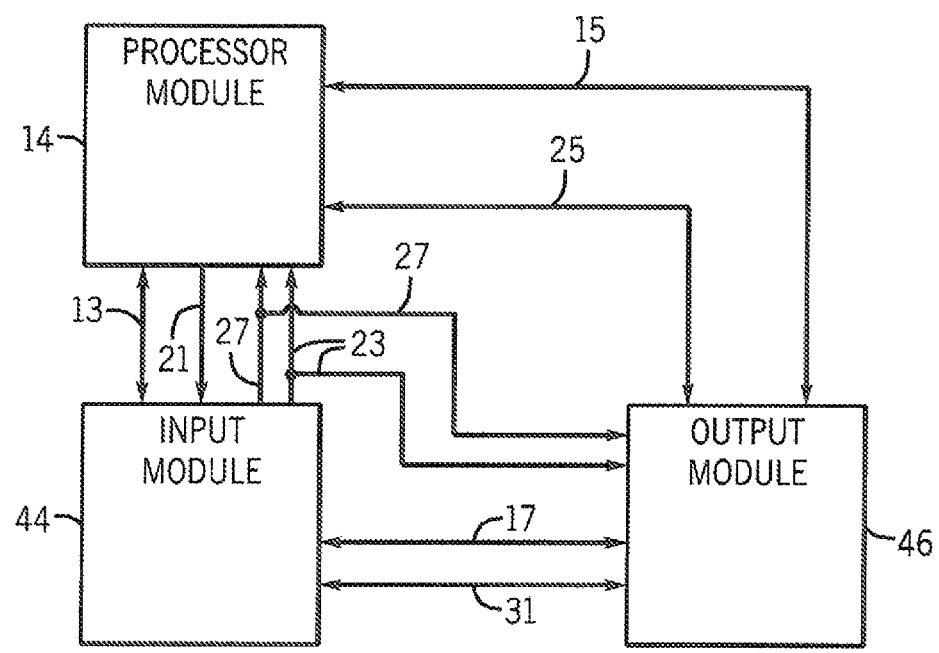
FIG. 3 is a block diagram representation of peer-to-peer communications between an input module and other modules according to one embodiment of the invention.

Referring next to FIG. 3, it is contemplated that input modules 44 and output modules 46 may be configured to communicate not only with the processor module 14 but also on a peer-to-peer basis. The process for configuring peer-to-peer communications and subsequent data transmission according to one embodiment of the invention is illustrated. The industrial control network includes at least one processor module 14, input module 44, and output module 46. Initial configuration of the input module 44 and the output module 46 is communicated from the processor module 14 via configuration communications 13 and 15, respectively. During power up or another user initiated configuration sequence, the processor module 14 transmits an initial configuration message 13 to the input module 44 and another initial configuration message 15 to the output module. The input module 44 sends a responsive configuration message 13 to the processor module 14, establishing communications between the processor and input modules, 44 and 14 respectively. The configuration message 15 to the output module 46 identifies the peer-to-peer relationship, defining the type of input module 44 to which the output module 46 is to connect and the data structure for that input module 44. The output module 46 then generates an initial configuration message 17 to the peer input module 44. The peer input module 44 sends a responsive configuration message 17 to the output module 46, establishing communications between the input module 44 and the output module 46. Upon successfully establishing the peer-to-peer connection, the output module 46 generates a responsive configuration message 15 to the processor module 14, establishing communications between the processor module 14 and the output module 46 as well as indicating to the processor module 14 that the peer-to-peer connection has been established.

After completing the initial configuration sequence and during normal operation, the processor module 14 periodically communicates with each of the input module 44 and the output module 46. Messages 25 between the processor module 14 and the output module 46 include, but are not limited to, updates to the output table from the processor module 14 to the output module 46 and operating status between each module. Similarly messages 21, 23 between the processor module 14 and the input module 44 include, but are not limited to, updates to the input table from the input module 44 to the processor module 14 and operating status between each module. The output module 46 also receives messages 23 from the input module that provide the current state of the input terminals 110 in the input module 44. In addition, a heartbeat message 31 may be communicated between the output module 46 and the input module 44 to verify that the communication channel between the two modules remains operational. In the distributed control network, both the input module 44 and the output module 46 which are configured in a peer-to-peer connection may be located at the same point on the controlled machine or process but remote from the central processor module 14. In fact, the input module 44 and the output module 46 may be mounted in the same rack and share a backplane 62. By passing the input signals directly to the output module 46 and generating an output signal responsive to these input signals, the responsiveness of the output module 46 is improved.

Figure 4:
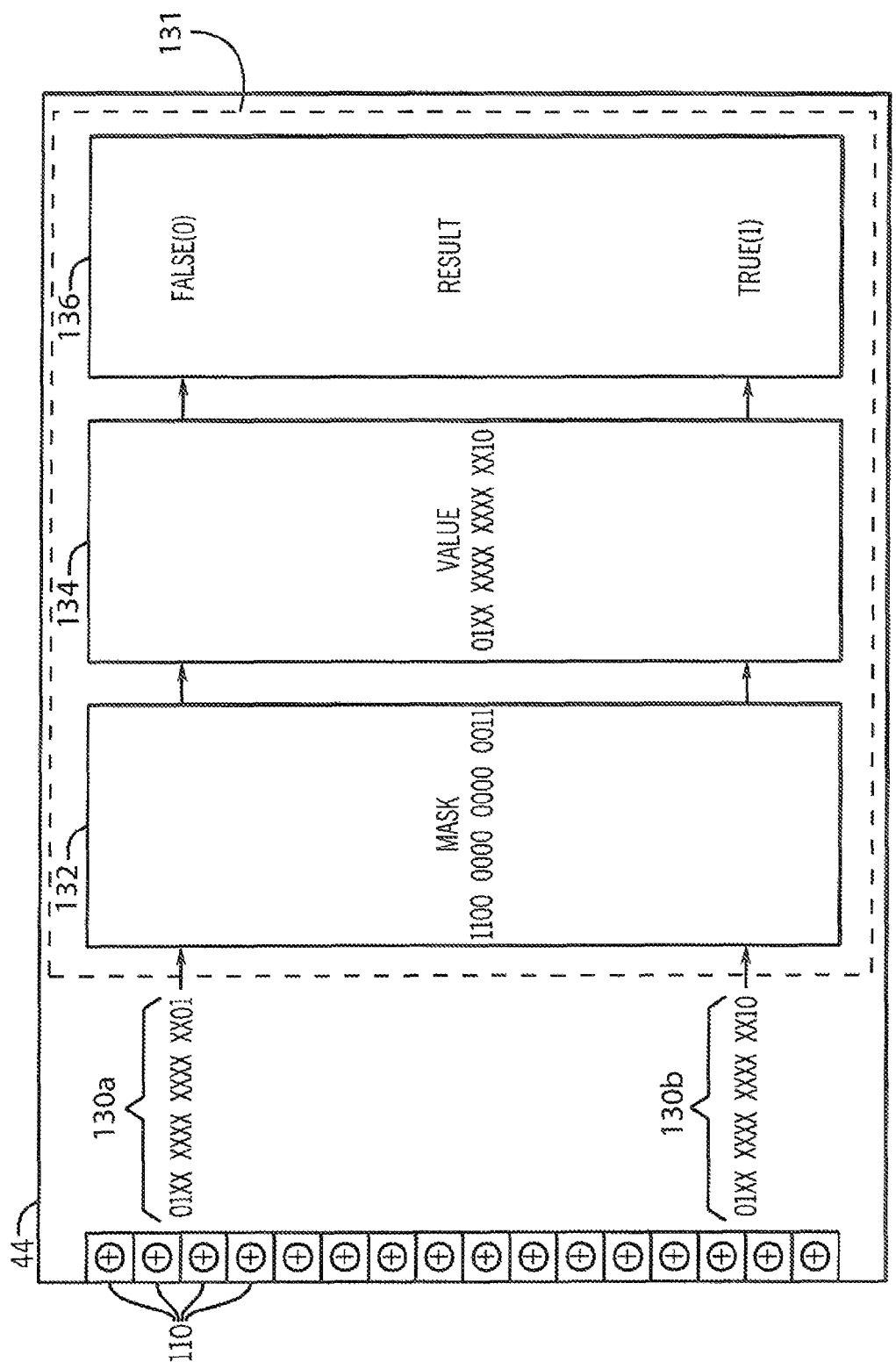
FIG. 4 is a block diagram representation of an event generator executing on an input module according to one embodiment of the invention.

According to one aspect of the invention, signals between one or more of the controlled devices 50 and one or more of the industrial controllers 10 may generate an event. Referring next to FIG. 4, one embodiment of an event generator 131 executing on the input module 44 is illustrated. Events are generated as a function of the state of the input terminals 110 and other status flags internal to the input module 44. The event generator 131 may execute on the processor 74, the processing logic 114, or a combination thereof. Events are communicated to the processor module 14 and, if configured, to a peer module via an event message 27. The input module 44 may be configured to transmit event messages 27 immediately upon occurrence or at periodic intervals, for example, in conjunction with transmitting the message 23 providing information on the state of the input terminals 110.

According to one embodiment of the invention, the event generator 131 generates events by detecting patterns of inputs present at the input terminals 110 as illustrated in FIG. 4. An exemplary input module 44 includes sixteen input terminals 110. The state of each input terminal is represented by a zero, indicating the input terminal is off; a one, indicating the input terminal is on; or an "x", indicating that the input terminal may be either on or off. A first exemplary state 130a indicates that terminals zero and fourteen are on, terminals one and fifteen are off, and that terminals two through thirteen may either be on or off. A second exemplary state 130b indicates that terminals zero and fifteen are off, terminals one and fourteen are on, and that terminals two through thirteen may either be on or off. The event generator 131 reads a first configuration parameter stored in the memory device 94 which identifies a mask 132 used to generate the event. The mask 132 includes a status bit for each input terminal 110 where a "1" indicates that the corresponding input terminal 110 is used to generate the event and a "0" indicates that the corresponding input terminal 110 is not used to generate the event. The illustrated mask 132 has a "1" set for bits zero, one, fourteen, and fifteen, meaning only these four input terminals will be used to generate the event. The event generator 131 reads another configuration parameter defining the matching value 134 of each bit that is required to trigger the event. The illustrated matching value 134 requires that terminal one and fourteen be on and that terminal zero and fifteen are off. Because terminals two through thirteen are not included in the mask 132, the matching value 134 does not care whether the setting for these terminals is on or off. As seen in the result box 136, the state of the input terminals 110 in the first exemplary state 130a that correspond to the mask 132 do not correspond to the matching value 134. Consequently, event generator 131 indicates "False" or that no event has occurred. In contrast, the state of the input terminals 110 in the second exemplary state 130b that correspond to the mask 132 do correspond to the matching value 134. As a result, the event generator 131 indicates "True" or that an event has occurred. Each input module 44 may have multiple sets of masks 132 and matching values 134 stored in the memory device 94, each set configured to generate an event according to a unique set of input signals and/or internal status bits. Optionally, the event generator 131 may be configured to read a single parameter in which each bit is defined, for example, by a character string in which at least three states may be defined. Each position in the string may be defined as a "0," a "1," or an "X," corresponding to the three states of the inputs.

Figure 6:
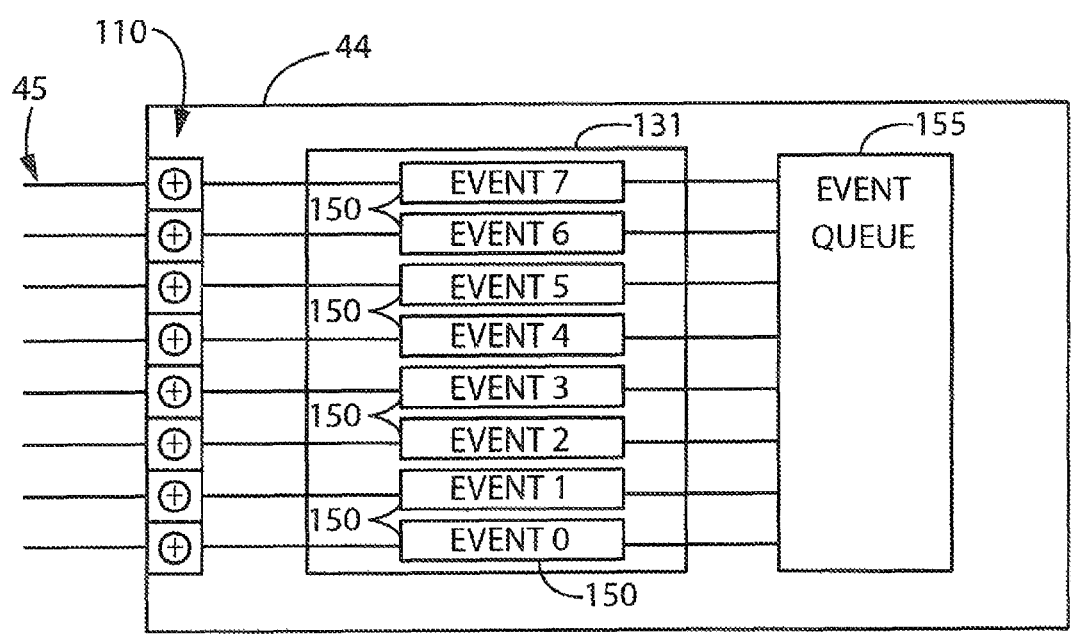
FIG. 6 is a block diagram representation of an event generator executing on an input module according to another embodiment of the invention.

According to another embodiment of the invention, the event generator 131 may be configurable to map a single input directly to an event. Referring to FIG. 6, input signals 45 from each input terminal 110 are provided to the event generator 131. The event generator 131 may be configured to detect a state transition, such that when the input of the channel mapped to an event enters one state (e.g., "1" or "ON), the event generator 131 generates an event. When the same input enters another state (e.g., "0" or "OFF") the event generator 131 may be configured to generate no event, generate a second event, or retrigger the same event. The memory device 94 may store a table defining each event task and which state, or transition in state, of the input signal 45 at each input terminal 110 causes an event to occur. It is contemplated that still other sequences and/or combinations of input signals 45 and the input terminals 110, output signals 47 from the output terminals 120, or a combination thereof, may be configured to generate an event without deviating from the scope of the invention.

With reference still to FIG. 6, an event queue 155 is provided which receives an indication of the occurrence of each event from the event generator 131. When each event occurs, the processor 74, logic circuit 114, or a combination thereof generates a snapshot of the data in the input module 44 at the time the event occurs. For example, in the illustrated digital input module 44, one of the input terminals 110 is assigned to generate Event 0 when the input transitions to a high, or on, state. The event generator 131 detects the transition to a high state at the corresponding input terminal 110 and copies the state of each of the eight input terminals 110 into one byte of memory and generates the indication that Event 0 has happened. The indication of Event 0 occurring is transmitted to the event queue 155 and the byte in which the state of each input terminal 110 is stored is similarly transferred to the event queue 155. Thus, the state of the input terminals 110 at the time the event occurred is stored for future processing by the control program. In addition to the state of each input terminal 110, it is contemplated that other internal status and/or control flags within the module 44 may be stored in memory when an event occurs.

Figure 7:
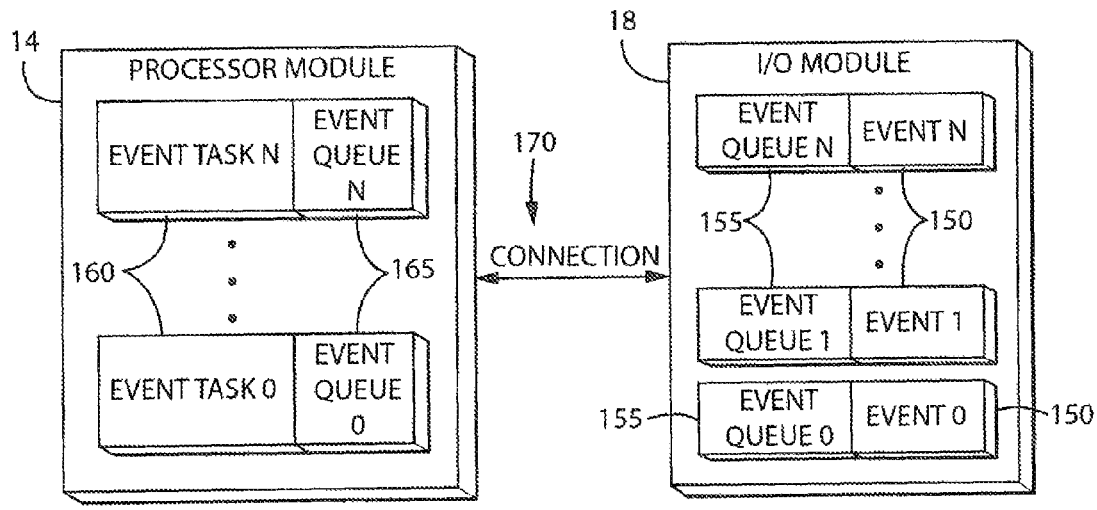
FIG. 7 is a block diagram representation of an event handling system according to one embodiment of the invention executing on an I/O Module and a processor module.
Figure 8:
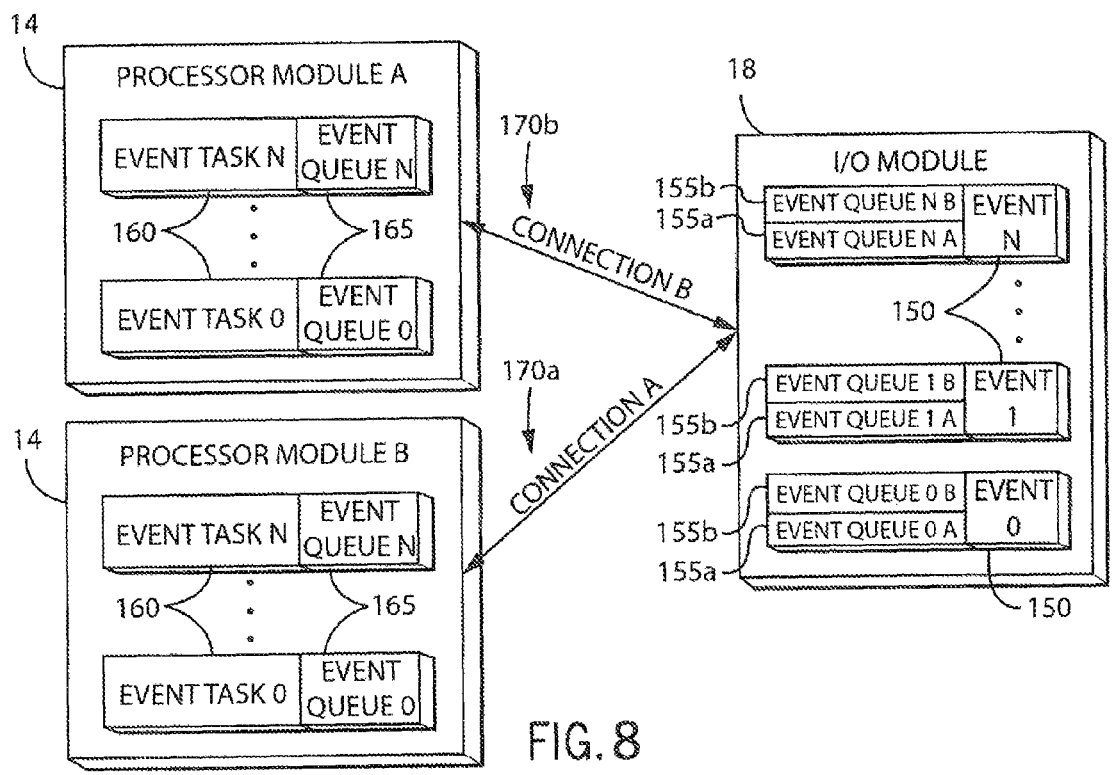
FIG. 8 is a block diagram representation of an event handling system according to another embodiment of the invention illustrating separate event queues for different processor modules.

With reference also to FIGS. 7 and 8, it is contemplated that a separate event queue 155 may be defined for each event 150. If using a single queue 155 for all of the events 150, as shown in FIG. 6, a signal identifying which event was triggered as well as the current state of the module must be stored in the queue 155. By defining separate queues 155 for each event 150, only the current state of the module needs to be stored when an event occurs. The current state of the module is stored in the queue 155 that corresponds to the event 150 and may be retrieved from the queue 155 by a corresponding event task 160.

Referring next to FIGS. 7-14, various embodiments of the event management system are illustrated. As illustrated in FIGS. 7 and 8, the queues 155 may be implemented in the I/O module 18, the processor module 14, or a combination thereof. A connection 170 is established between ports on the I/O module 18 and the processor module 14. As discussed above, the connection 170 may be established via a backplane 62 and backplane connectors 60 when the two modules are located in the same rack or via network media 32, 36, network ports 101-103, and any additional network devices 34 located between the modules when the two modules are located remotely. The I/O module 18 may store the event data in a local event queue 155 or transmit the event data via the connection 170 to a processor event queue 165 for subsequent processing.

Figure 5:
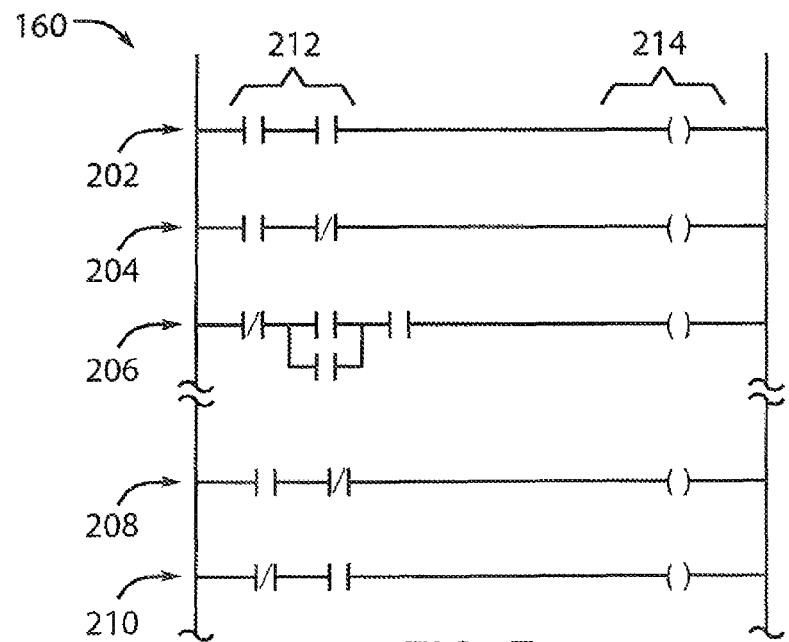
FIG. 5 is an exemplary event task programmed in relay ladder logic.

Event tasks 160 are defined for each event 150 to be detected. The event task 160 defines one or more operations that are to occur when an event 150 is detected. An exemplary event task 160 is programmed in "ladder logic" format as illustrated in FIG. 5. It is contemplated that the event task 160 may be programmed in other programming languages without deviating from the scope of the invention. The event task 160 receives the state of module when the event occurs and uses these states as input signals 212 in the ladder logic. Output signals 214 are set/reset according to the ladder logic defined in the event task 160. The resulting output signals 214 may then be transmitted to output modules 46 from the processor module 14 or, between the input module 44 and the output module 46 if the two modules are configured for peer-to-peer communication.

Figure 9:
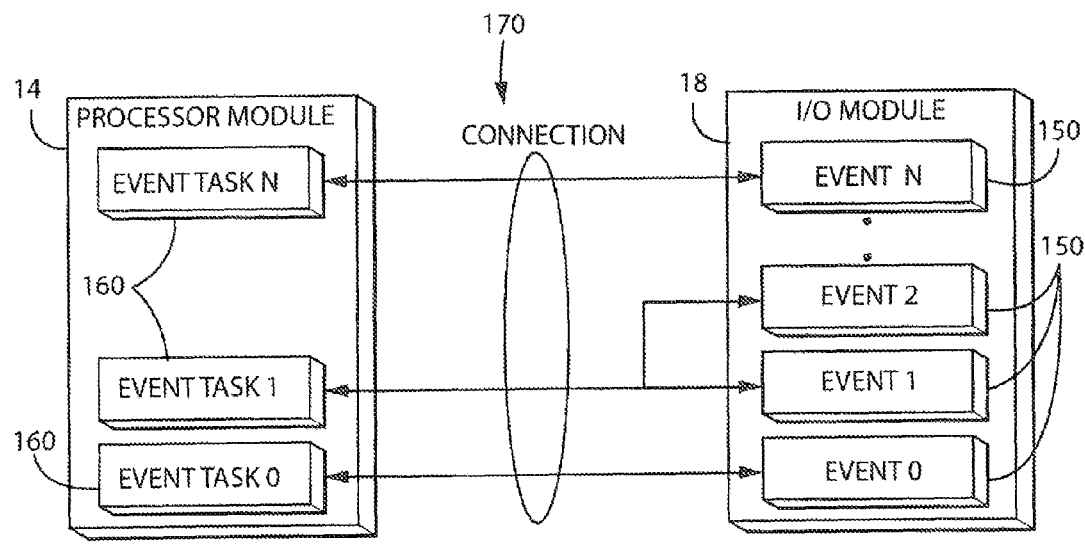
FIG. 9 is a block diagram representation of an event handling system according to another embodiment of the invention illustrating multiple events triggering a single event task.
Figure 10:
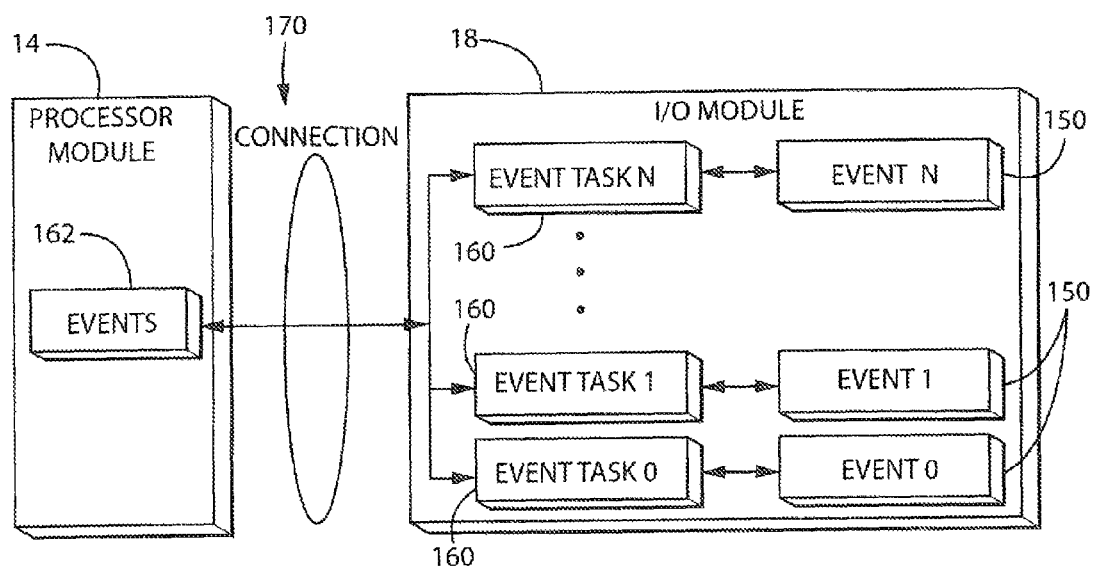
FIG. 10 is a block diagram representation of an event handling system according to another embodiment of the invention illustrating event tasks executing on the I/O module.

As illustrated in FIGS. 9 and 10, the event tasks 160 may be executed in the processor module 14, the I/O module 18, or a combination thereof. Where the event task 160 is executed may be determined as a function of the application requirements. When event data is present in an event queue 155, 165 (see also FIGS. 7 and 8), the processor for the module on which the queue 155, 165 is located initiates execution of an event task 160. For purposes of illustration, it will be assumed that the queue 155 is present on the I/O module 18 on which the event 150 was detected; however, the concepts disclosed herein are equally applicable to a remote queue such as the processor queue 165 discussed above. According to still another embodiment of the invention, queuing may be performed using both a queue 155 on the I/O module 18 and a queue 165 on the processor module 14. With reference to FIGS. 7 and 9, events 150 are stored in a queue 155 on the I/O module 18. When an event 150 occurs or is queued, the event 150 and event data is transmitted to the processor module 14 via a connection 170 between the modules. The processor module 14 includes a table stored in memory identifying which event task 160 is to be executed for each event 150. Each event 150 may correlate to a specific event task 160. However, as shown, it is also contemplated that multiple events 150, such as Event 1 and Event 2, may initiate execution of a single event task 160, such as Event Task 1. With reference to FIG. 10, it is contemplated that the event task 160 is executed in the I/O module 18. Because scan time delays between modules and transmission delays over network connections and/or backplanes may limit the rate at which an event task 160 is initiated after reception of the event 150, it may be desirable to store the event task 160 in the I/O module 18. When an event 150 occurs or is queued, the event 150 triggers the event task 160. An event task monitor routine 162 may exist in the processor module 14 to monitor when event tasks 160 are executed on the I/O module 18. The I/O module 18 may transmit an indication of the event 150 occurring, the event data, the output of the event task 160, or a combination thereof to the event task monitor routine 162 via a connection 170 such that the processor module 14 is aware that the event 150 occurred.

Figure 11:
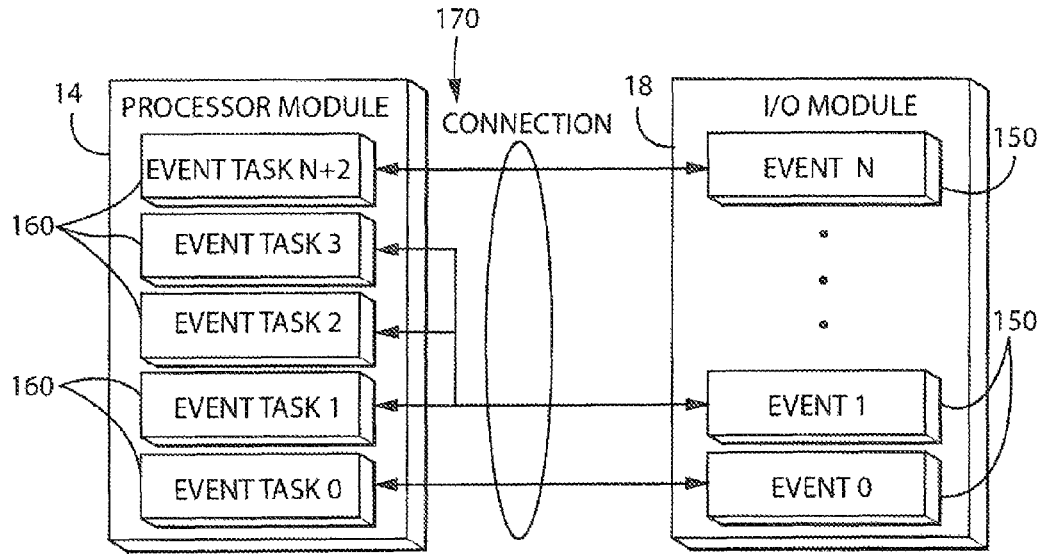
FIG. 11 is a block diagram representation of an event handling system according to another embodiment of the invention illustrating a single event triggering multiple event tasks.

Referring next to FIG. 11, one event 150 may initiate multiple event tasks 160. According to the illustrated embodiment, Event 0 and Event N are each configured to initiate a single event task 160. Event 1, however, is configured to initiate three event tasks 160. In addition to defining which event tasks 160 are executed by each event 150, the table stored in the processor module 14 may further include an order of execution for multiple event tasks 160 initiated by a single task 150. Optionally, each event task 160 may be assigned a priority and the event tasks 160 may execute according to the assigned priority. It is further contemplated that event task identifiers may be stored in the event queue 165 along with the event data. Optionally, a separate queue may be defined for event tasks and for events. When multiple event tasks 160 are initiated by a single event 150, event tasks 160, or an identifier for each event task 160, that require execution may then be loaded into one of the predefined queues.

Figure 12:
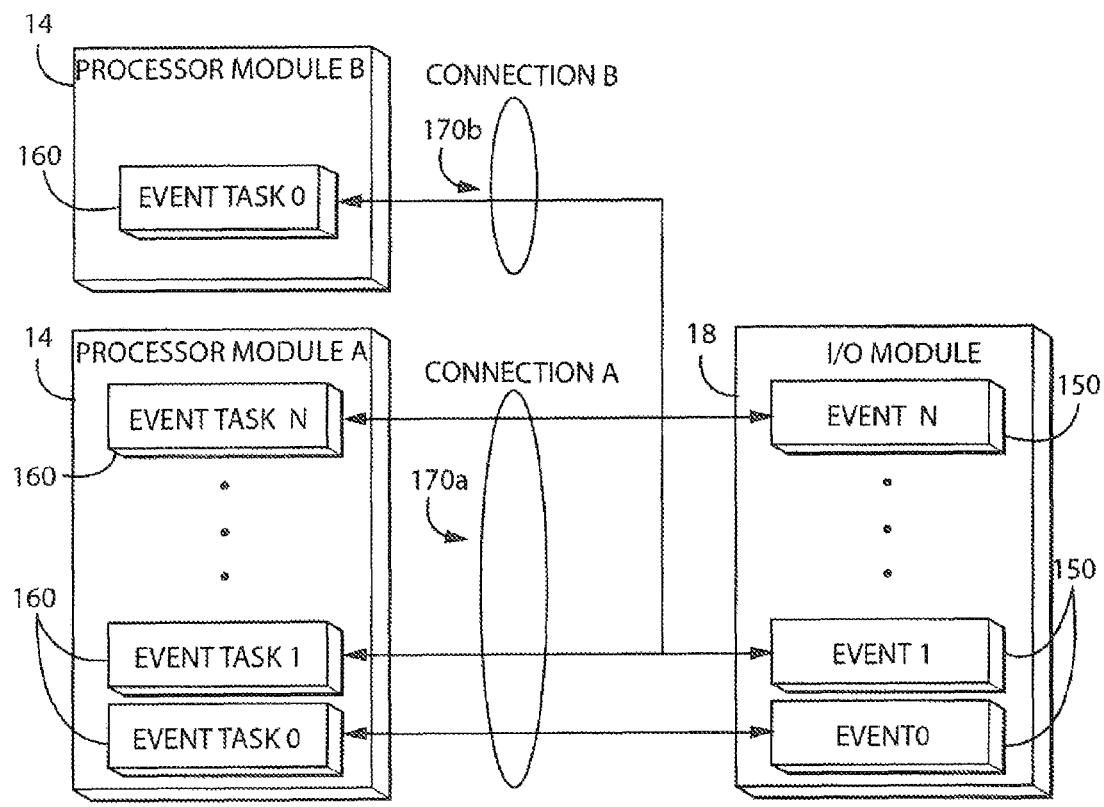
FIG. 12 is a block diagram representation of an event handling system according to another embodiment of the invention illustrating a single event triggering event tasks on multiple processor modules.

Referring next to FIG. 12, one event 150 may initiate event tasks 160 in multiple processor modules 14. A connection 170 may be established between the I/O module 18 and each of two processor modules 14, which may be located in separate industrial controllers 10. According to the application requirements, it may be necessary for an event 150 occurring on one I/O module 18 to initiate event tasks 160 on both processor modules 14. Referring again to FIG. 8, separate event queues 155 may also be defined in the I/O module 18 for transmission of events to each processor module 14. Each processor module 14 may initiate execution of a single event task 160 or multiple event tasks 160 as discussed above with respect to a single processor module 14.

Figure 13:
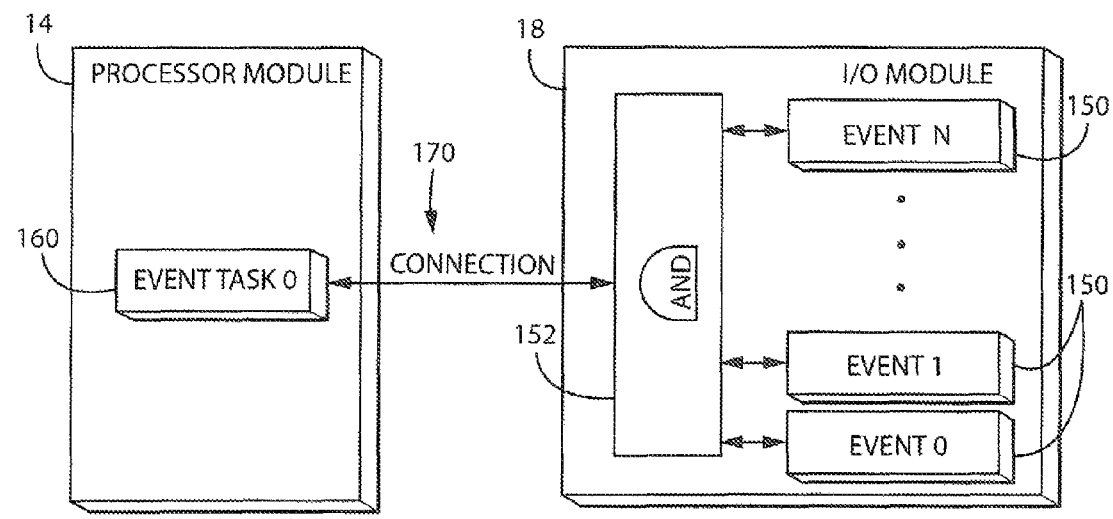
FIG. 13 is a block diagram representation of an event handling system according to another embodiment of the invention illustrating a combination of multiple events triggering a single event task.
Figure 14:
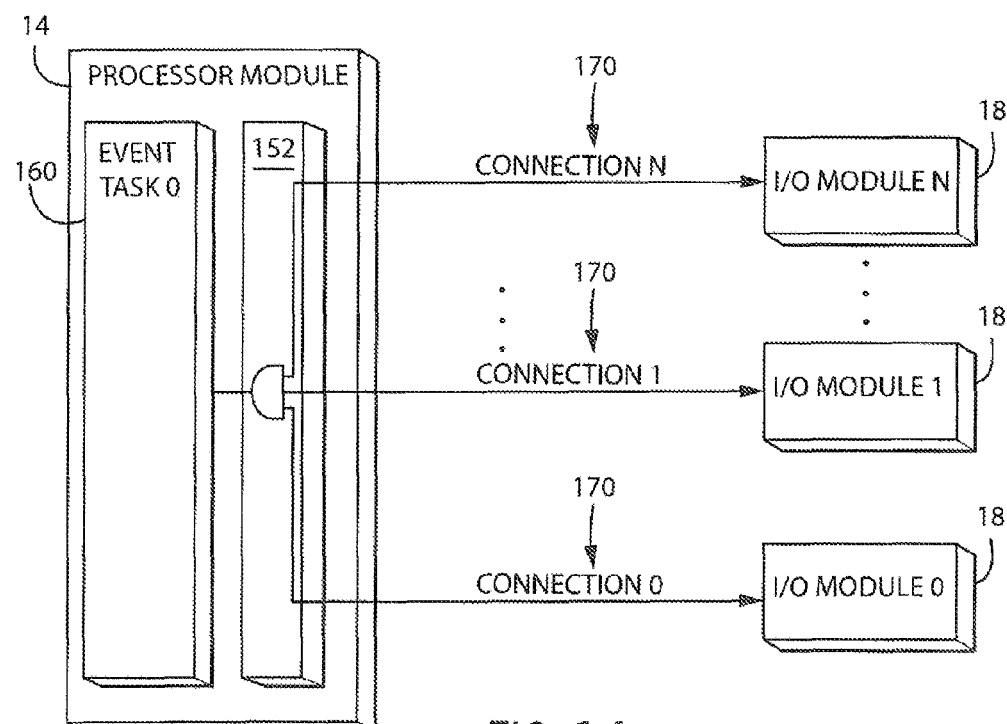
FIG. 14 is a block diagram representation of an event handling system according to another embodiment of the invention illustrating a combination of multiple events occurring on separate I/O modules triggering an event task.

According to another aspect of the invention, a combination of events 150 may be required to initiate an event task 160, as shown in FIGS. 13 and 14. An event task logic circuit 152 may be used to define a combination or a sequence of events 150 that must occur in order to initiate execution of an event task. In FIG. 13, for example, an "AND" gate indicates that Event 0, Event 1, and Event N must each occur to initiate execution of Event Task 0. The event task logic circuit 152 may be implemented in the I/O Module 18 or in the processor module 14. It is contemplated that the event task logic circuit 152 may consist of discrete logic elements, be implemented in the processor of the respective module 14, 18, or a combination thereof. The event task logic circuit 152 may define multiple combinations of events 150 that require a combination of events 150 to occur (i.e. "AND"), one of multiple events 150 to occur (i.e. "OR"), or a combination thereof. It is further contemplated that the event task logic circuit 152 may require a sequence of events 150 to occur in order to initiate an event task 160. For example, if Event 0 occurs first and Event 1 occurs next, the event task logic circuit 152 may initiate execution of Event Task 0. However, if Event 1 occurs first and Event 0 occurs next, the event task logic circuit 152 may either cause no event task 160 to be initiated or initiate a different event task, such as Event Task 1.

Figure 15:
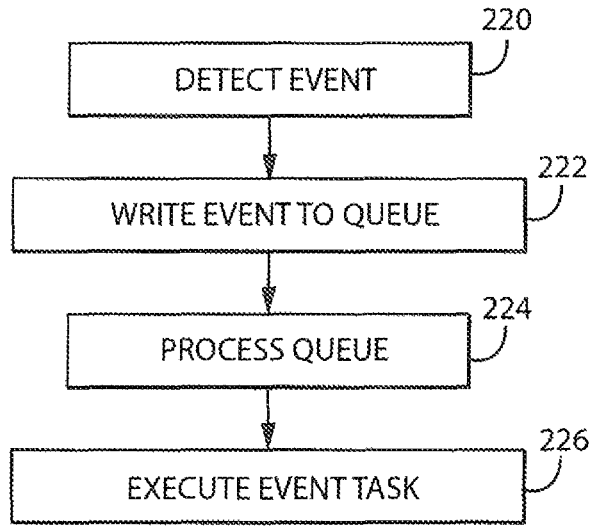
FIG. 15 is a flowchart graphically illustrating the steps required to initiate execution of an event task.
Figure 16:
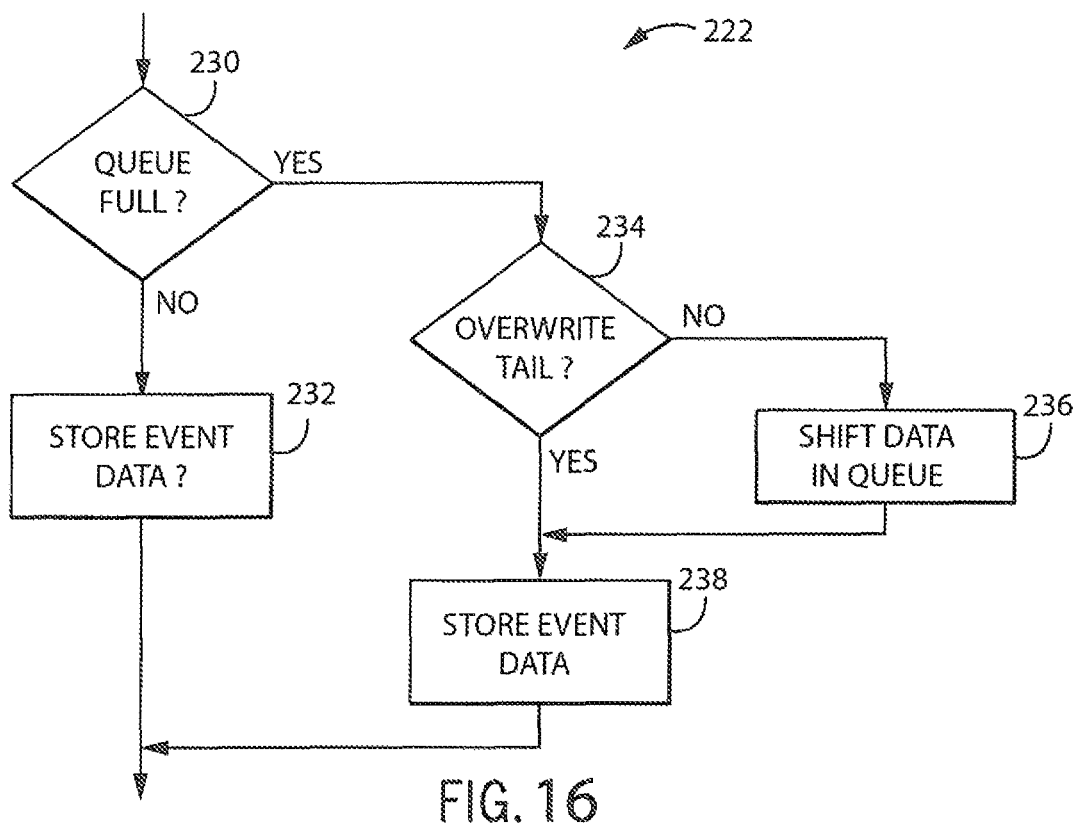
FIG. 16 is a flowchart graphically illustrating the steps required to write an event to a queue as shown in FIG. 15.
Figure 17:
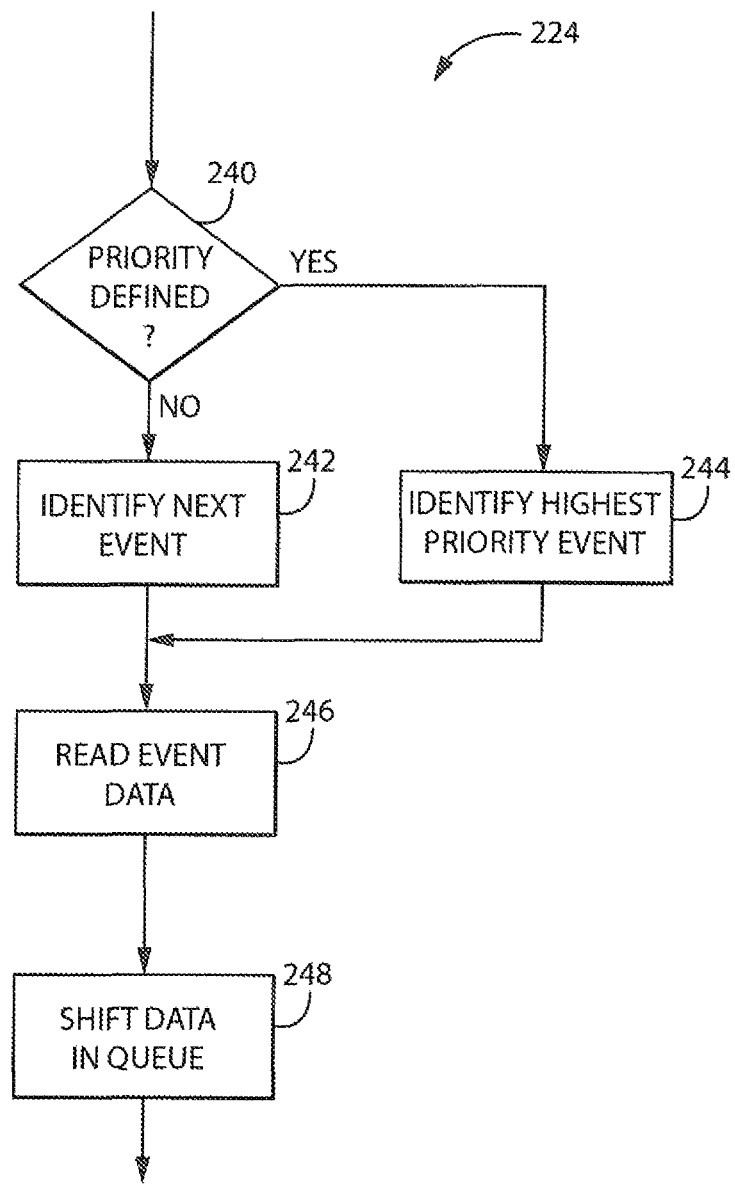
FIG. 17 is a flowchart graphically illustrating the steps required to process the queue as shown in FIG. 15.

Turning next to FIGS. 15-17, the steps for managing multiple events in an industrial controller according to one embodiment of the invention are illustrated. At step 220, an event 150 is detected on one of the I/O modules 18 in the industrial controller 10. The event 150 is stored in an event queue 155, 165 in the I/O module 18 in which the event is detected or in a processor module 14 on the industrial controller 10, as shown in step 222. When storing the event 150, event data including the state of some or all of the terminals on the I/O module 18 in which the event 150 is detected may be stored in the queue. The event data may also include internal status flags of the I/O module 18 which identify a current state of the I/O module 18. For purposes of illustration, storing the event 150 to a queue will be discussed with respect to a local queue 155 in the I/O module 18. It is understood that similar steps may be followed to store event data in a remote queue 165 located, for example, in the processor module 14. At step 230, the I/O module 18 checks if the queue 155 is full. If there is room in the queue 155, the module may write the event data directly into the next open slot in the queue 155, as shown in step 232. The queue 155 may be configured to store, for example, four (4), eight (8), or any other desired number of events and their corresponding event data. If the queue 155 is full, the I/O module 18 determines how the queue is configured to handle an overflow of the queue 155. At step 234, the I/O module 18 determines whether the queue 155 is configured to overwrite the tail, or end, of the queue 155. If the queue 155 is configured to overwrite the tail of the queue 155, the new event and corresponding event data may be written to the last slot in the queue 155, as shown in step 238. Optionally, the queue 155 may be configured to drop the head of the queue 155. As shown in step 236, the data in each slot of the queue 155 may be shifted up one slot in the queue 155 prior to writing the new event and its corresponding event data to the last slot in the queue at step 238. According to still another option (not shown), the queue 155 may be configured to drop the newest event 150. In this configuration, no new event data is stored when the queue 155 is full. Rather, the event data is only stored when there is a slot available in the queue 155.

At step 224, the I/O module 18 then processes the queue 155. Because the steps for storing data to the queue were discussed with respect to a local queue 155, the steps for processing the queue will similarly be discusses with respect to a local queue 155. It is understood that the similar steps may be followed, for example, in a processor module 14 storing a remote queue 165 to process the remote queue 165. As shown in step 240, the I/O module 18 may first determine if a priority is defined for each event 150. An internal setting may identify whether events are stored in the queue 155 with a priority level. Optionally, a field in the event data may be reserved for a priority level. If no priority is set in the field, the I/O module 18 determines that the priority is not being defined. If no priority is being defined, the I/O module 18 identifies the event 150 and corresponding event data at the front of the queue 155 (e.g., the event 150 that has been in the queue 155 the longest). If a priority is being defined for each event 150, the I/O module 18 identifies which event 150 in the queue 155 has the highest priority. In this manner, if multiple events 150 occur while the event task for another event is executing, a desired order of execution for each event task corresponding the queued events 150 may be defined. The I/O module 18 identifies which of the events 150 has the highest priority as shown in step 244. If multiple events 150 have an identical priority, the I/O module 18 may then revert to a first-in-first-out system to identify the event 150 with the highest priority that has been in the queue 155 for the longest duration. At step 246, the I/O module 18 reads the event 150 and corresponding event data from the queue 155. The remaining events 150 and their corresponding event data may then be shifted up one slot in the queue 155 with the last slot becoming an open slot, as shown in step 248.

As step 226, the event task 160 is executed. The I/O module 18 may initiate execution of the event task 160 by transmitting the event 150 and the corresponding event data to the processor module 14 via a connection 170. According to one embodiment of the invention, the event task 160 to be executed corresponds to an event identifier transmitted to the processor module 14. The I/O module 18 on which the event is identified may store the event task identifier with the event data or may access a table stored in memory on the I/O module 18 to identify which event task 160 is to be initiated by each event 150. Optionally, the I/O module 18 may transmit an event identifier which corresponds to the identified event 150 rather than the event task 160 to be executed. The processor module 14 may access a table stored in memory on the processor module 14 to identify which event task 160 is to be initiated by each event 150. The processor module 14 then executes the program steps defined in the event task 160. The processor module 14 may temporarily suspend execution of another control program executing on the processor module 14 in order to execute the steps in the event task 160. Optionally, if the processor module 14 is configured to process steps in parallel, the event task 160 may be executed in tandem with another control program. Upon completion of the event task 160, the processor module 14 sends a status flag to the I/O module 18 indicating that the event task 160 is complete. The I/O module 18 again performs the steps to process the queue 155. If another event 150 occurred during execution of the event task 160, the I/O module 18 transmits the next event identifier and corresponding event data to the processor module 14 and the next event task 160 is executed.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An Input/Output (I/O) module for an industrial controller operable to control a machine or process, the I/O module comprising:

a plurality of terminals, wherein each terminal is configured to transmit one of an input signal and an output signal between the I/O module and a controlled device for the machine or process, wherein the input signal and the output signal each have at least one state;

an event generator operable to generate an event responsive to a predefined state or a combination of states of at least one input or output signal at the plurality of terminals;

an event queue configured to:
  receive each event generated, wherein each event is configured to trigger an event task,
  receive a state of the I/O module, wherein the state of the I/O module includes the state of all of the plurality of terminals at the time each event is generated,
  store a plurality of events, and
  store the state of the I/O module along with the corresponding event; and a processor operable to receive each event in a particular order from the event queue and to initiate execution of an event task corresponding to the received event using the corresponding stored state of the I/O module.

2. The I/O module of claim 1 further comprising a memory device configured to store a plurality of event tasks and wherein the processor initiates execution of the event task by identifying one of the plurality of event tasks corresponding to each event and executing the identified event task responsive to receiving each event.

3. The I/O module of claim 1 further comprising a communication port configured to establish a connection with a processor module, wherein the processor in the I/O module initiates execution of the event task by transmitting each event received from the event queue to the processor module and wherein the processor module includes a memory device configured to store a plurality of event tasks, identifies one of the plurality of event tasks corresponding to each event, and executes the identified event task responsive to receiving each event.

4. The I/O module of claim 3 wherein the processor module is a first processor module and the communication port is further configured to establish a connection with a second processor module, and wherein the processor in the I/O module transmits each event received from the event queue to at least one of the first and the second processor modules.

5. The I/O module of claim 4 wherein the event queue is a first event queue, the I/O module further comprising:
  a second event queue configured to receive each event generated and to store a plurality of events; and
  a memory device configured to store a table defining whether each event generated is sent to the first event queue or the second event queue, wherein the first event queue receives events to be transmitted to the first processor module and the second event queue receives events to be transmitted to the second processor module.

6. The I/O module of claim 1 wherein each event is assigned a priority and wherein the processor initiates execution of each event task based on the priority assigned to each event in the event queue.

7. The I/O module of claim 1 wherein the processor is operable to initiate execution of a plurality of event tasks corresponding to one of the plurality of events.

8. An event handling system for an industrial control system, the event handling system comprising:
  an Input/Output (I/O) module having:
    a plurality of terminals, wherein each terminal transmits one of an input signal and an output signal between the I/O module and a controlled device in the industrial control system, and
    an event generator operable to generate an event responsive to a predefined state or a combination of states of at least one input or output signal of at least one of the plurality of terminals, wherein the input signal and the output signal at each terminal has at least one state;
  a processor module operable to execute at least one event task responsive to each event; and
  a memory device in one of the I/O module and the processor module, wherein:
    the memory device is configured to store an event queue,
    an indication of each event is loaded in the event queue when the event is generated,
    the event queue is configured to store a state of the I/O module when each event is generated,
    the state of the I/O module includes the state of the at least one input or output signal at all of the plurality of terminals at the time each event is generated, and
    the processor module receives the indication of each event in a particular order from the event queue to initiate execution of the at least one event task corresponding to the event using the corresponding stored state of the I/O module.

9. The event handling system of claim 8 wherein the processor module is a first processor module, the event handling system further comprising a second processor module operable to execute at least one event task responsive to each event, wherein each of the first processor module and the second processor module receives at least a portion of the indication of each event to initiate execution of the corresponding at least one event task.

10. The event handling system of claim 8 wherein each event is assigned a priority and wherein the processor module initiates execution of each event task based on the priority assigned to each event in the event queue.

11. The event handling system of claim 8 wherein the processor module is operable to initiate execution of a plurality of event tasks corresponding to one of the plurality of events.

12. The event handling system of claim 8 wherein the I/O module is a first I/O module, the event handling system further comprising a second I/O module having:
  a plurality of terminals, wherein each terminal transmits one of an input signal and an output signal between the I/O module and a controlled device in the industrial control system, and
  an event generator operable to generate an event responsive to a predefined state or a combination of states of at least one input or output signal of at least one of the plurality of terminals, wherein the processor module is operable to execute the at least one event task responsive to a first event generated on the first I/O module and a second event generated on the second I/O module.

* * * * *